United States Patent
Bacon

(10) Patent No.: US 6,722,011 B1
(45) Date of Patent: Apr. 20, 2004

(54) APPARATUS AND METHOD FOR INSTALLING A C-CLIP

(76) Inventor: Bradley Bacon, 2211 Hilltown Pike, Perkasie, PA (US) 18944

( * ) Notice: Subject to any disclaimer, the term of this patent is extended or adjusted under 35 U.S.C. 154(b) by 0 days.

(21) Appl. No.: 10/434,960

(22) Filed: May 9, 2003

(51) Int. Cl.$^7$ ................................................. A23P 11/02
(52) U.S. Cl. ...................... 29/451; 29/222; 29/888.09; 29/235; 29/243.56; 29/229; 29/225; 403/282; 403/274
(58) Field of Search .......................... 29/222, 223, 224, 29/243.518, 243.56, 235, 271, 280, 282, 888.04, 888.05, 888.051, 428, 437, 439, 443, 449, 450, 453, 457, 464, 468, 506, 507, 512, 522.1, 523; 285/321, 39; 403/345, 376, 315–317, 274, 279, 280, 282; 411/517, 913

(56) References Cited

U.S. PATENT DOCUMENTS

| | | | |
|---|---|---|---|
| 3,382,015 A | * | 5/1968 | Steidl .......................... 384/439 |
| 3,997,961 A | | 12/1976 | Sandrick |
| 4,118,851 A | | 10/1978 | De Martelaere |
| 4,118,852 A | | 10/1978 | Schneider |
| 4,212,096 A | * | 7/1980 | Saito et al. .................... 29/235 |
| 4,287,807 A | * | 9/1981 | Pacharis et al. ............... 411/42 |
| 4,530,141 A | | 7/1985 | Vachon |
| 4,541,158 A | | 9/1985 | Zumwalt |
| 4,589,180 A | | 5/1986 | Vachon |
| 4,807,343 A | * | 2/1989 | Wadsworth ................. 29/221.5 |
| 4,843,668 A | * | 7/1989 | Bondar .......................... 7/164 |
| 5,138,752 A | * | 8/1992 | Tasner .......................... 29/235 |
| 6,062,187 A | | 5/2000 | Pattakos et al. |
| 6,507,985 B1 | * | 1/2003 | Loughlin et al. ............. 29/229 |

* cited by examiner

*Primary Examiner*—Peter Vo
*Assistant Examiner*—Stephen Kenny
(74) *Attorney, Agent, or Firm*—Fox Rothschild LLP

(57) ABSTRACT

Disclosed herein is an apparatus and method for installing a c-clip outside a far end of a passage. In some embodiments, the apparatus comprises prong members each comprising a prong end, a base end, and a lip part. A base is secured to the base ends, so the prong members are parallel with each other, and so the lip parts form a ring-shaped lip adapted to secure the c-clip. A tube is provided comprising an inner surface having a varying radius. The base inserts the prong members through the tube and against the inner surface, the inner surface forcing the c-clip to close into a closed c-clip. The prong ends are moved at least partially through the rear of the tube, and in some embodiments through a tube extension, permitting a restoring force of the c-clip to open the c-clip.

50 Claims, 3 Drawing Sheets

US 6,722,011 B1

APPARATUS AND METHOD FOR INSTALLING A C-CLIP

BACKGROUND OF THE INVENTION

The invention disclosed herein relates generally to an apparatus and method for installing a c-clip. More specifically, embodiments of the disclosed invention relate to a cool for installing a c-clip outside a far end of a passage.

Embodiments of a c-clip usually comprise a ring-like piece of metal that is open in it natural state. However, c-clip can be forced into a closed position, thereby reducing the overall radius of the c-clip. The reduced radius of a c-clip permits the c-clip to be inserted into destinations where it could not have been inserted with its larger radius. In some situations, the reduced-radius c-clip is inserted into a place, where the c-clip then opens into its natural state as a result of its own restoring force.

One example of this situation is in the construction of an engine piston unit. The interior of the piston is hollow and has a wristpin running across the length of the hollow to hold at its center a reciprocating rod. Since the wristpin length is shorter than the length of the hollow, a hole is bored on each side of the engine piston unit. Each end of the wristpin rests in each one of the bores. However, means are necessary to keep the wristpin from sliding horizontally along the longitudinal axis of the bores. A c-clip is useful, for example, to prevent said wristpin sliding.

However, in this example, the radius of the bore is smaller than the radius of the open c-clip and larger than the radius of the c-clip, thus allowing passage only of the c-clip in closed position. At the end of the bore near the wristpin is a groove having a larger radius than the open c-clip. This allows the open c-clip to securely rest near the wristpin, where the groove holds it in place. A c-clip is placed in the groove of each bore so that one c-clip is used for each end of the wristpin.

However, this type of construction presents the problem of how to actually insert the c-clip through the bore and into groove. Furthermore, this problem is persistent in any context where a c-clip needs to be installed outside a far end of a passage. Manual insertion might be possible in some situations, but extremely difficult due to the size of the components. Moreover, it is increasingly difficult to install a c-clip in situations where the passage is increasingly long.

SUMMARY OF THE INVENTION

Disclosed herein is an apparatus and method for installing a c-clip outside a far end of a passage. The apparatus comprises a plurality of prong members each comprising a prong end and a base, where at least a subset of the plurality of prong member each have a lip part below the prong end; a base secured to the base ends, so that each of the plurality of prong members are substantially parallel with each other of the plurality of prong members, and so that the lip parts form a ring-shaped lip adapted to secure the c-clip; and a tube comprising an inner surface having a varying radius, an outer surface, a front opening having a front opening inner surface radius, and a rear opening having a rear opening inner surface radius; wherein the base is operable to insert the prong members at least partially through the front opening and against the inner surface, the inner surface forcing the c-clip to close into a closed c-clip and the prong ends to converge into converged prong ends, and wherein the base is operable to move the prong ends at least partially through the rear opening. The illustrated embodiment comprises four prong members, four base ends, four prong ends, and four lip parts.

In some embodiments, the base is operable to move the prong ends at least partially through the rear opening, thereby permitting a restoring force of the closed c-clip to open the closed c-clip. Moreover, in some embodiments, each base end is evenly spaced to form at the base an outline of a regular polygon shape. In some embodiments, each prong end comprises a sector shaped prong end, and wherein the converged prong ends comprise at least one of a ring shape and a circle shape. In some embodiment, each sector shaped prong end is associated with a central angle approximately equal to the quotient of 360 degrees divided by a value representative of a total quantity of the plurality of prong ends.

In some embodiments, the base and at least one of the plurality of prong members form a unitary structure. In some embodiments, at least one of the plurality of prong members comprises at least one resilient prong member. In some embodiments, the base is operable to move the prong ends at least partially through the rear opening, thereby permitting a restoring force of the closed c-clip to open the closed c-clip.

In some embodiments, the front opening inner surface radius of the tube is greater than the rear opening inner surface radius of the tube. Moreover, some embodiments comprise a tube extension comprising a tube extension inner surface radius substantially equal to the rear opening inner surface radius; a tube extension outer surface radius; and a tube extension rear opening; wherein the tube extension extends from the rear opening and is sized to be insertable in the passage. In some embodiments, the base is operable to move the prong ends at least partially through the tube extension rear opening, thereby permitting a restoring force of the closed c-clip to open the closed c-clip.

Also disclosed herein is an apparatus for installing a c-clip outside a far end of a passage. The apparatus comprises compression means for closing the c-clip; positioning means for positioning the closed c-clip through the passage and outside the far end; and securing means for securing the clip during compression and positioning. In some embodiments, the apparatus comprising expansion means for opening the closed c-clip at the far end.

Also disclosed herein is a method for installing a c-clip outside a far end of a passage. The method comprises providing a plurality of prong members each comprising a prong end and a base end, at least a subset of the plurality of prong member each have a lip part below the prong end; providing a base secured to the base ends, so that each of the plurality of prong members are substantially parallel with each other of the plurality of prong members, and so that the lip parts form a ring-shaped lip adapted to secure the c-clip; providing a tube comprising an inner surface having a varying radius, an outer surface, a front opening, and a rear opening; placing the c-clip on the ring-shaped lip; using the base to insert the prong members at least partially through the front opening and against the inner surface, so that the varying radius forces the c-clip to close into a closed c-clip and the prong ends to converge into converged prong ends; and using the base to move the prong ends at least partially through the rear opening. In some embodiments providing a tube comprises providing a tube having a front opening inner surface radius that is greater than a rear opening inner surface radius.

In some embodiments, using the base to move comprises using the base to move the prong ends at least partially through the rear opening to permit a restoring force of the closed c-clip to open the closed c-clip. In some embodiments, using the base to move comprises at least one of operating the base by hand, operating the tube by hand, operating the base by machine, and operating the tub by machine.

In some embodiments, using the base to move comprises using the base to move the prong ends at least partially through the rear opening to permit a restoring force of the closed c-clip to open the closed c-clip. In some embodiments, providing a plurality of prong members comprises providing four prong members, four base ends, four prong ends, and four lip parts. In some embodiment, providing the base and providing at least one of the plurality of prong members comprises providing a unitary structure. In some embodiments, providing the plurality of prong members comprises providing a plurality of a sector shaped prong ends.

In some embodiments, the method comprises providing a tube extension extending from the rear opening, having a tube extension inner surface radius substantially equal to the rear opening inner surface radius, a tube extension outer surface radius sized to fit within the passage, and having a tube extension rear opening, and wherein using the base to move comprises using the base to move the prong ends at least partially through the tube extension rear opening to permit a restoring force of the closed c-clip to open the closed c-clip. In some embodiments, the method comprises inserting the tube extension in the passage, wherein using the base to move comprises using the base to move the prong ends at least partially through the tube extension rear opening to permit a restoring force of the closed c-clip to open the closed c-clip outside the far end.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings.

DETAILED DESCRIPTION OF PREFERRED EMBODIMENTS

Figure 1:
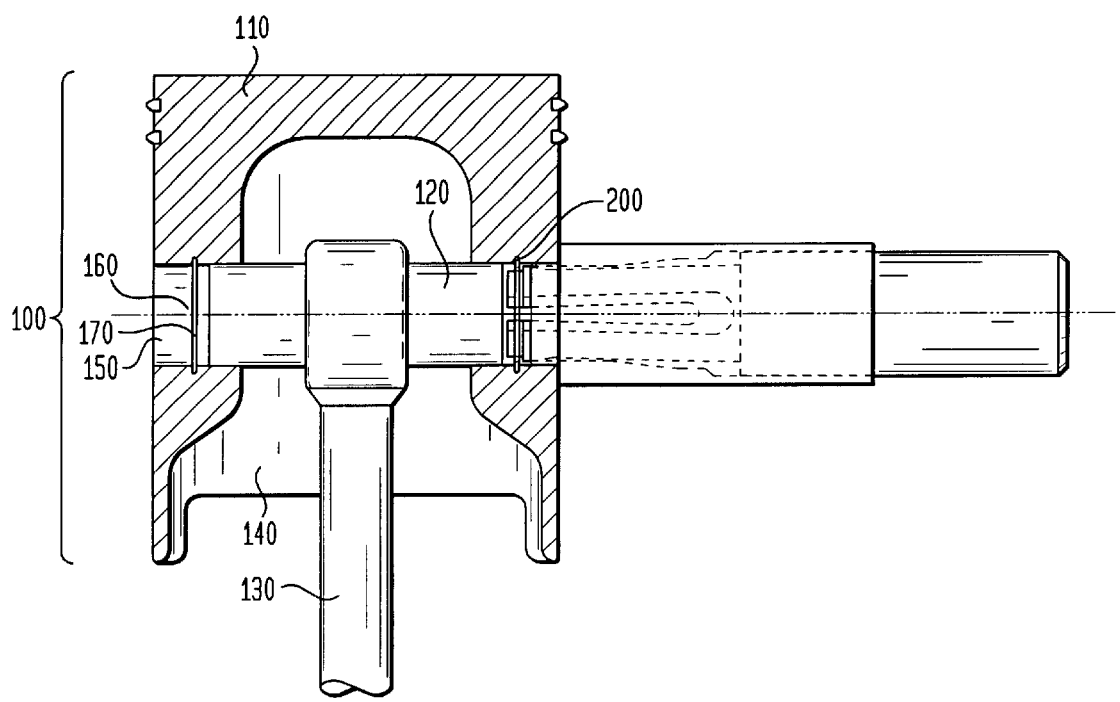
FIG. 1 is a cross-sectional side view drawing showing an embodiment of an engine piston unit, a c-clip, and an apparatus for installing the c-clip.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Referring to FIG. 1, an embodiment of an engine piston unit 100 is shown. While the present invention does not require an engine piston unit 100 and/or any of the engine piston's constituent parts, the engine piston unit 100 is shown to illustrate without limitation an example of the tool's use. The engine piston unit 100 comprises a shell 110, a wristpin 120, a connecting rod 130, a piston interior 140, and a plurality of passages 150, where each passage has a far end 160 and a groove 170.

The piston interior 140 is a hollow that allows partial movement of the connecting rod 130. In turn, the connecting rod 130 is fixed by a wristpin 120 that runs through said end of the connecting rod 130. The wristpin 120 travels across the piston interior 140 and is fixed on a first axis, such as a vertical axis for example, by resting the ends of the wristpin 120 inside bores traveling from the exterior of the engine piston unit 100, through the piston shell 110, and to the piston interior 140.

The wristpin 120 occupies part, but not all of each bore. There thus remains two passages 150 that each travel from the exterior of the engine piston unit 100 and partially through the shell 110. Between the passage 150 and the end of the wristpin 120 is a groove 170. In the embodiment shown in FIG. 1, the groove 170 is outside each of the passage far ends 160, the groove 170 having a radius that is larger than the radius of the far end 160 of the passage 150. Moreover, the radius of groove 170 is just large enough for a c-clip 200 to be confined in its open position. In the present example of the engine piston unit 100, the c-clips 200 would rest inside the grooves 170 outside the far ends 160 of passage 150. C-clips 200 are used to fix the wristpin 120 on a horizontal axis, for example. In one embodiment, the groove 170 is sized so that there is play for the wristpin 120 to rotate about its longitudinal axis.

Importantly, it should be noted that the engine piston 100 of FIG. 1 is only an example for illustrating a sample passage 150 and sample passage far end 160, where embodiments of the tool would be useful for installing a c-clip. Embodiments for installing a c-clip 200 may be utilized in any suitable situation where there is a need to compress a c-clip 200 into a closed position, and move the compressed c-clip 200 through a passage in a manner so that the c-clip 200 is positioned outside the far end of the passage for expansion. The term "far end" as used herein, is used to refer to any end of a passage except the end in which the c-ring is inserted. In most cases, the far end opens to an area generally inaccessible to the c-clip except for when the c-clip is first moved through the passage. In another example, in the case where a narrow passage immediately opens to a wider passage, the area outside the far end of the narrow passage would be the area at the beginning of the wide passage.

Figure 2A:
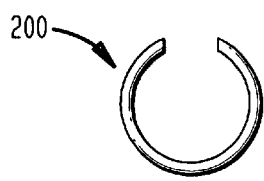
FIG. 2a is a front view drawing showing an embodiment of an open c-clip.
Figure 2B:
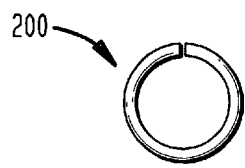
FIG. 2b is a front view drawing showing an embodiment of a closed c-clip.

Referring to FIGS. 2a–2b, an embodiment of a c-clip 200 is shown in its open and closed positions. The c-clip 200 is preferably constructed of a metal or some other resilient material. In some embodiments, the c-clip 200 is firm enough so that it generally keeps its open position shape, such as the shape shown in FIG. 2a, for example. However, the c-ring 200 should be compressable into a closed position, such as the shape shown in FIG. 2b, for example.

In some embodiments, the metal or other c-clip material should be resilient enough so that when compression means are removed from the closed c-clip, the restoring force of the metal or other material opens the c-clip 200 back into its open position. If the restoring force of the metal is not great enough to revert the c-clip 200 back to an open position, means can be used to open the c-clip 200. Examples of expansion means will be discussed further below with reference to FIGS. 4a–4c.

Generally speaking, in order to install the c-clip 200 outside a far end 160 of a passage 150, a human or machine utilizes embodiments of both a prong unit 300 and a tube unit 400. The c-clip 200 is placed on the prong unit 300 and pushed through the tube unit 400 to compress the c-clip 200. The prong unit 300 forces the c-clip 200 out of the other side of the tube unit 400, where the c-clip 200 expands into its designated position.

Figure 3A:
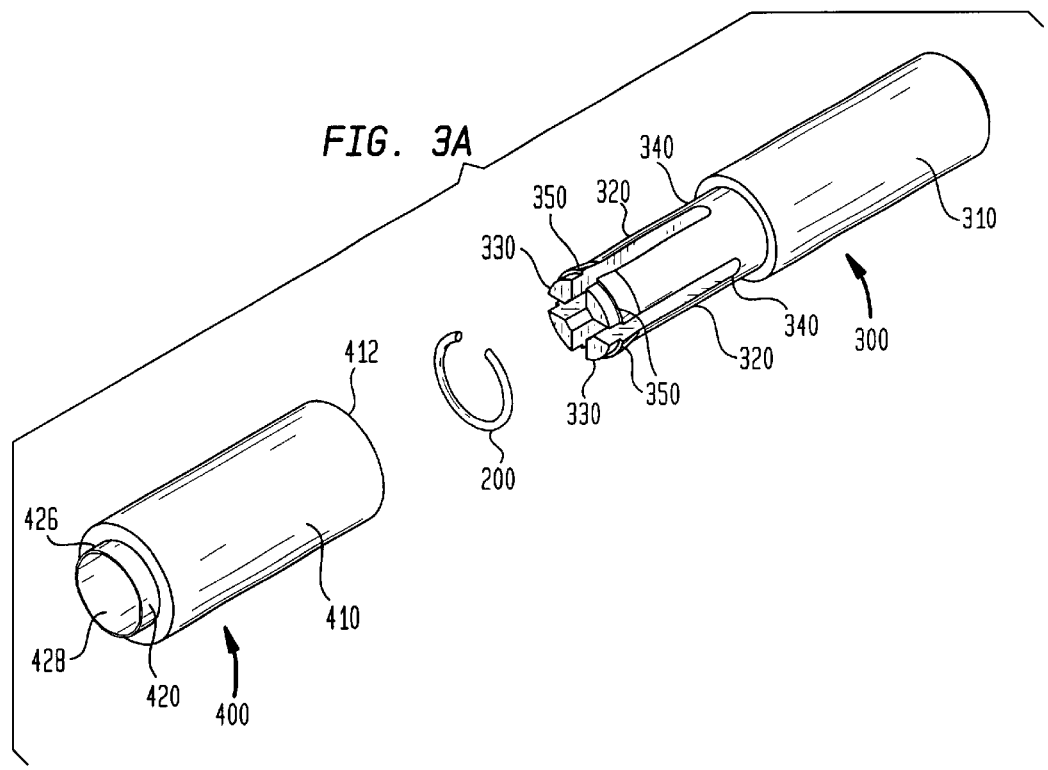
FIG. 3a is an exploded perspective view drawing showing an embodiment of a prong unit, a tube unit, and a c-clip.
Figure 3B:
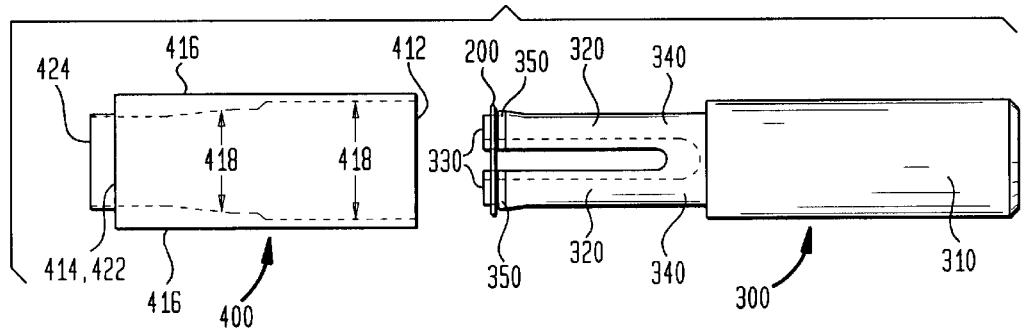
FIG. 3b is a side view drawing showing an embodiment of a prong unit, a tube unit, and a c-clip.

Referring to FIGS. 3a–3b, a sample embodiment of a prong unit 300 is illustrated. The prong unit comprises a base 310 and a plurality of prong members 320. Each prong member 320 comprises a prong end 330 and a base end 340. Preferably all of the prong members 320 have a lip part 350 below the prong end 330. However, it is only required that a subset of the prong members each have a lip part 350. The sample embodiment that is frequently discussed herein comprises four prong members 320, each having a prong end 330, a base end 340, and a lip part 350.

The base 310 is sized to attach to all of the prong members 320. The base 310 and the prong members 320 are preferably a single unitary structure, such as a plastic shape from a single mold. However, in some embodiments, the base 310 and prong members 320 are separate pieces and are either removeably or nonremoveably attached at the base ends 340. In some embodiments, the base is cylindrical and sized to fit within a portion of the tube unit 400 having a large enough inner surface radius. In some embodiments, the base ends 340 are attached to the base in an evenly spaced manner that form an outline of a regular polygon shape at the base. It is apparent to one skilled in the art that the greater the number of evenly spaced base ends 340 there are, the more the regular polygon will assume the appearance of a ring. The scope of the term "regular polygon", commonly refers to shapes having sides of equal length, such as a square or octagon for example. As used herein, the scope of the term also include a ring and/or a circle shape.

The prong members 320 are preferably parallel to one another in their natural, unmodulated state. In some embodiments, at least one of the prong members 320 are constructed of a resilient material. For example, when a base end 340 is held firmly by the base 310 and a prong end 330 is moved from its original position and then released, the restoring force of the resilient material would revert the prong end 330 back to its original position. Each of the prong members 320 are preferably of equal length.

Figure 3C:
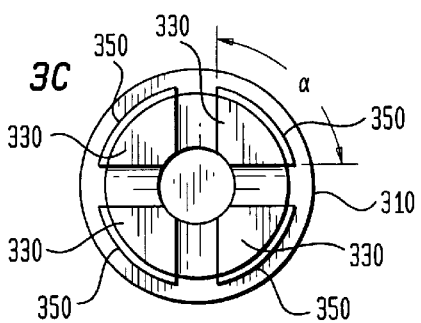
FIG. 3c is a front view drawing showing an embodiment of a prong unit.

Referring to FIG. 3c, each prong member 320 has a prong end 330. In some embodiments, each prong end 330 is shaped like a sector so that if and/or when the prong ends 330 converge together, the sectors collectively form a ring-like shape. When the prong ends 330 are in their initial position (not converged) the sectors form a broken ring-like shape. The broken ring-like shape and the unbroken ring-like shape permit the c-clip 200 to fit comfortably around the unconverged prong ends 330 and converged prong ends 330.

While the sector shape is preferably a ring-sector, in some embodiments the sector shape comprises a circle-sector. In some embodiments, including the illustrated embodiment, the ring-sector shape of the prong end 330 continues through a substantial length of the prong member 320.

In some embodiments, each of the sector shaped prong ends 330 are associated with a central angle $\alpha$. In some embodiments, the central angle $\alpha$ is the angle of the vertex formed if the two lines of the sector's straight sides are extended to touch each other. In some embodiments, the central angle $\alpha$ is substantially equal to 360 degrees divided by the number of prong ends 330. Thus, in a sample embodiment containing four sector prong ends, the central angle $\alpha$ corresponding to each sector prong end 330 is substantially equal to 90 degrees. The term "substantially equal" is used rather than the term "equal" to at least account for embodiments in which the converged sector prong ends 330 form a ring shape and/or circle shape, but do not form a perfect ring and/or a perfect circle. In some embodiments, each of the central angles a are not equal and/or substantially equal to each other.

Referring again to FIGS. 3a–3b, each of the prong members 320 have a lip part 350. In some embodiments, the lip part 350 is just below the prong end 330. In some embodiments, the lip part 350 comprises a raised ledge. In some embodiments, the underside of the raised ledge gradually slopes down to the prong member. As will be further discussed herein in connection with FIGS. 4a–4c, a gradual slope facilitates the pulling of the prong members 320 backwards through an opening having a radius smaller than the radius of the prong unit 300 at the lip parts 350. The gradual slope coupled with the resiliency of the prong members 320 allows the prong members 320 to bend inward toward the longitudinal axis of the prong unit 300 thereby decreasing the radius at the lip parts 350 to a radius smaller than the radius of the opening.

In some embodiments, each lip part 350 follows the perimeter of the outer arc of its corresponding sector prong end 330. Although the lip parts 350 are not attached or necessarily touching when the prong members 320 are in an unmodulated position, the lip parts 350 secure the c-clip 200. The lip part 350 is a sample embodiment of a securing means for securing the c-clip during its compression, positioning, and in some embodiments, expansion. However, any suitable securing means may be utilized so long as the means secure the c-clip 200 in both the closed and open positions.

Continuing with reference to FIGS. 3a–3b, a sample embodiment of a tube unit 400 is illustrated. The tube unit 400 comprises a tube 410 having a tube front opening 412, a tube rear opening 414, a tube outer surface 416, and a variable radius tube inner surface 418. Some embodiments of the tube unit 400, including the embodiment shown in the figures, include a tube extension 420, which will be further discussed below. When the tube extension 420 is present, the tube 410 still has a "rear opening," the rear opening 414 of the tube 410 referring to the portion of the tube 410 immediately preceding the tube extension 420. Similarly, the "front opening" 412 of the tube extension 420 refers to the portion of the tube extension immediately following the tube 410.

In some embodiments, the tube outer surface 416 is cylindrical and has a constant radius measured from the central longitudinal axis of the tube 410. This shape is particularly advantageous when a tube 410 is to be inserted into a passage 150. However, in some embodiments, the shape of the tube outer surface 416 is immaterial so long as the shape of the tube inner surface 418 is suitable. For example, if the tube 410 is not to be inserted into a passage 150, then the shape of tube outer surface 416 is less important. However, to maximize versatility, the preferred embodiment of the tube 410 is with a cylindrical tube outer surface 416.

The variable radius of tube inner surface 418 is measured from the central longitudinal axis of the tube 410. In some embodiments, including the illustrated embodiment, the variable radius tube inner surface 418 has at least one continuous length of constant radius and at least one continuous length of variable radius. In one embodiment, the continuous length of constant radius is adjacent to the tube front opening 412 and the continuous length is sized to permit insertion of the base 310. Further insertion of the base 310 is prevented by the eventually decreasing radius, which has at least some points with a radius smaller than the radius of the base 310. In some embodiments, including the illustrated embodiment, the radius of the tube inner surface 418 is greater at the tube front opening 412 than the radius of the tube inner surface 418 at the tube rear opening 414.

As will be further discussed below with reference to FIGS. 4a–4c, sliding the c-clip against the inner surface 418 has the effect of compressing the c-clip 200 into a closed position and converging the prong ends 330 of the resilient prong member 320. A tube inner surface 418 having a decreasing radius is the preferable compression means for closing the c-clip, however any suitable compression means may be utilized.

In some embodiments, the tube unit 400 also comprises a tube extension 420 through which the converged prong members 320 are pushed. The tube extension 420 has a front opening 422, a rear opening 424, a tube extension outer surface 426, and a tube extension inner surface 428. The tube extension 420 preferably lies on the same axis as the tube 410 as shown in the figures. In some embodiments, the tube extension 420 does not have a constant radius, however it is a preferable embodiment where the tube extension 420 does have a constant radius. In preferred embodiments, the radius of the tube extension outer surface 426 is sized to fit within passage 150. In some embodiments, the radius of the tube extension inner surface 428, at least at its front opening 422, is substantially equal to the radius of the tube inner surface 418 at the tube rear opening 414. In some embodiments, the converged members are pushed through the tube rear opening 414, the tube extension front opening 422, through the tube extension 420, and out the tube extension rear opening 424.

In some embodiments, the tube extension front opening 422 is attached to the tube rear opening 414. In some embodiments, the attachment is either a permanent attachment, such as where the tube 410 and tube extension 420 are a unitary molded structure, for example. In some embodiments, the tube 410 and tube extension 420 are removeably attached, such as where a snap, friction fit, threads, or any other suitable means are used for attachment. As will be discussed herein, embodiments of the tube extension 420 are sized to be at least partially inserted into the passage 150. Embodiments that have removeably attached tube extensions 420 allow swapping of tube extensions 420 of different lengths, to accommodate passages 150 of different lengths.

The tube extension 420 is one example of a positioning means for positioning the closed c-clip outside the far end of a passage, such as passage 150 for example. However, in some of the embodiments where a tube extension 420 is not used, the gradually sloping underside of the lip parts 350 function as positioning means. For example, when the horizontal component of the slope is sized to be substantially equal to (or greater than) the length of the passage, then the prong members 320 can be inserted through the tube rear opening 414 and then through the passage to position the c-clip outside the far end of the passage. In some embodiments, for example where the horizontal component of the slope is to short for the prong ends 330 to extend far enough through the passage, the tube 410 may be used for positioning if the radius of the tube outer surface 416 is less than the radius of the passage 150. Again, any positioning means may be used so long as the positioning means are suitable for positioning the closed c-clip outside the far end of a passage.

Figure 4A:
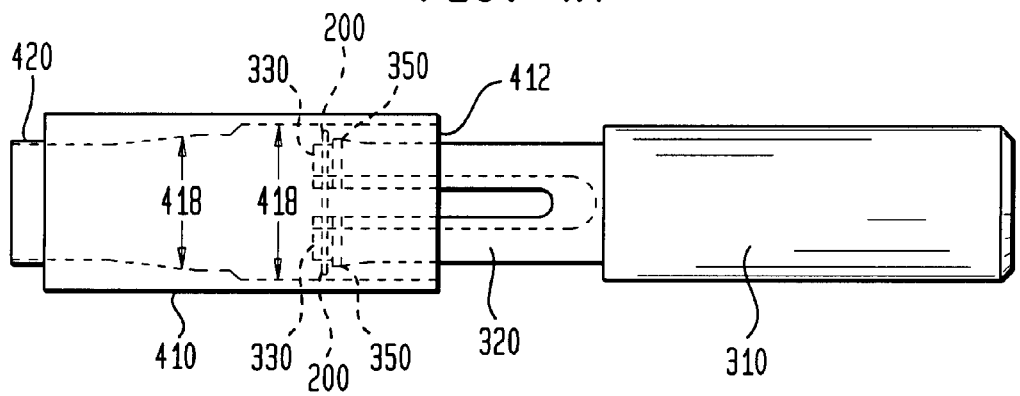
FIG. 4a. is a side view drawing showing an embodiment of the relationship between the prong unit, tube unit, and c-clip.
Figure 4B:
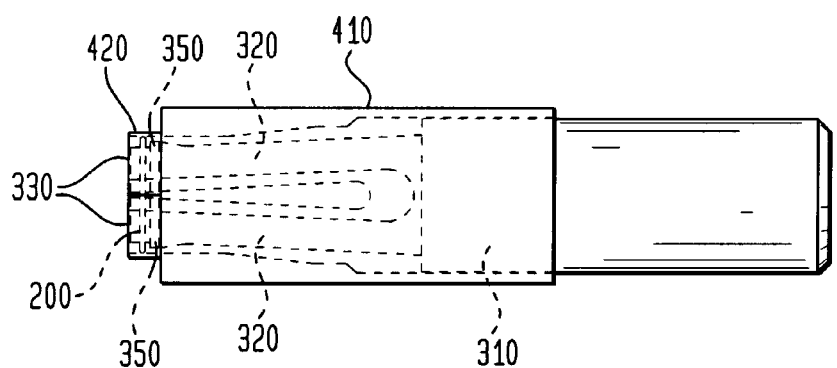
FIG. 4b. is a side view drawing showing an embodiment of the relationship between the prong unit, tube unit, and c-clip.
Figure 4C:
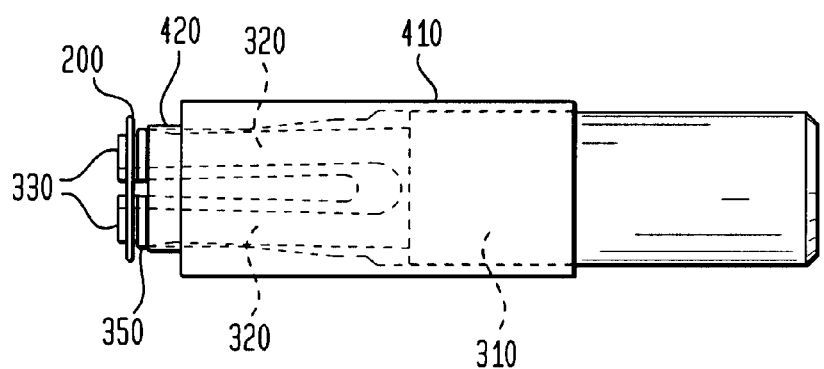
FIG. 4c. is a side view drawing showing an embodiment of the relationship between the prong unit, tube unit, and c-clip.

Referring to FIGS. 4a–4c, an embodiment of the method will now be further discussed. The prong unit 300 comprises a base 310, four resilient prong members 320 each having a base end 340, and a sector-shaped prong end 330 and a lip part 350. The central angle α of each sector prong end 330 is substantially equal to ninety degrees. A human and/or a machine places an open c-clip 200 on the unconverged lip parts 350 near the prong ends 330.

The prong unit 300 is operable by a human and/or machine by grasping the base 310, for example. In some embodiments, the base 310 is part of the machine operating the prong unit. The base 310 is used to insert the prong ends 330 into the tube unit 400. The illustrated embodiment of the tube unit 400 contains a tube 410 and tube extension 420. The base 310 inserts the prong ends 330, lip parts 350, and resilient prong members 320, through the tube front opening 412 and down the length of the tube 410. The tube inner surface 418, while having a constant radius at first, eventually has a variable radius.

The variable radius decrease from a radius equal to the radius of the tube front opening 412 to the radius of the tube rear opening 414. As the c-clip 200 is forced against a decreasing radius length of the tube inner surface 418, the c-clip is compressed into its closed position. Inner surface 418 also forces the prong ends 330 towards the central longitudinal axis of the tube 410, the resiliency of the prong members 320 allowing the prong ends 330 to converge. The lip parts 350 form into a ring-shaped lip 350 that secures the c-clip.

The converged prong ends 330 and closed c-clip 200 are forced through the tube rear opening 414 and enter the tube extension 420. The tube extension front opening 422 has a tube extension inner surface 426 with a radius substantially constant and equal to the radius of the tube inner surface 418 at the tube rear opening 414. In some embodiments, the tube extension is inserted into the passage 150 of the engine piston unit 100 so that it may position the closed c-clip 200 outside the far end. 160. Thus, as the converged prong ends 330 and closed c-clip 200 are forced through the tube extension, the closed c-clip 200 is in effect being forced through the passage 150.

The tube extension 420 positions the c-clip 200 outside the far end 160. In the illustrated embodiment of FIG. 1, the c-clip is positioned at the groove 170. The converged prong ends 330, closed c-clip 200, and ring shaped lip 350 are forced out of the tube extension rear opening 424. As these components exit the tube extension rear opening 424, the vertical vector of the underside of the lip increases, while permitting the resiliency of the converged prong members 320 to diverge the converged prong ends 330. The c-clip

200, now in the groove 170 outside the far end 160 of the passage 150, opens into its open position as a result of either or both of the restoring force of the c-clip's metal and the restoring force of the resilient prong members 320.

Although there has been hereinabove described an apparatus and method for installing a c-clip, in accordance with the present invention, for the purposes of illustrating the manner in which the invention may be used to advantage, it should be appreciated that the invention is not limited thereto. Accordingly, any and all modifications, variations, or equivalent arrangements which may occur to one skilled in the art should be considered to be within the scope of the present invention as defined in the appended claims.

What is claimed is:

1. An apparatus for installing a c-clip outside a far end of a passage, the apparatus comprising:
    a plurality of prong members each comprising a prong end and a base, and where at least a subset of the plurality of prong member each have a lip part below the prong end;
    a base secured to the base ends, so that each of the plurality of prong members are substantially parallel with each other of the plurality of prong members, and so that the lip parts form a ring-shaped lip adapted to secure the c-clip; and
    a tube comprising an inner surface having a varying radius, an outer surface, a front opening having a front opening inner surface radius, and a rear opening having a rear opening inner surface radius;
    wherein the base is operable to insert the prong members at least partially through the front opening and against the inner surface, the inner surface forcing the c-clip to close into an at least partially closed c-clip and the prong ends to converge into converged prong ends, and wherein the base is operable to move the prong ends at least partially through the rear opening.

2. The apparatus of claim 1, wherein the base is operable to move the prong ends at least partially through the rear opening, thereby permitting a restoring force of the closed c-clip to open the closed c-clip.

3. The apparatus of claim 1, wherein each base end is evenly spaced to form at the base an outline of a regular polygon shape.

4. The apparatus of claim 1, wherein each prong end comprises a sector shaped prong end, and wherein the converged prong ends comprise at least one of a ring shape and a circle shape.

5. The apparatus of claim 4, wherein each sector shaped prong end is associated with a central angle approximately equal to the quotient of 360 degrees divided by a value representative of a total quantity of the plurality of prong ends.

6. The apparatus of claim 1, comprising four prong members, four base ends, four prong ends, and four lip parts.

7. The apparatus of claim 1, wherein the base and at least one of the plurality of prong members form a unitary structure.

8. The apparatus of claim 1, wherein the front opening inner surface radius is greater than the rear opening inner surface radius.

9. The apparatus of claim 1, comprising a tube extension comprising:
    a tube extension inner surface radius substantially equal to the rear opening inner surface radius;
    a tube extension outer surface radius; and
    a tube extension rear opening;
    wherein the tube extension extends from the rear opening and is sized to be insertable in the passage.

10. The apparatus of claim 1, wherein at least one of the plurality of prong members comprises at least one resilient prong member.

11. The apparatus of claim 10, wherein the base is operable to move the prong ends at least partially through the rear opening, thereby permitting a restoring force of the closed c-clip to open the closed c-clip.

12. The apparatus of claim 11, wherein each base end is evenly spaced to form at the base an outline of a regular polygon shape.

13. The apparatus of claim 11, wherein each prong end comprises a sector shaped prong end, and wherein the converged prong ends comprise at least one of a ring shape and a circle shape.

14. The apparatus of claim 13, wherein each sector shaped prong end is associated with a central angle approximately equal to the quotient of 360 degrees divided by a value representative of a total quantity of the plurality of prong ends.

15. The apparatus of claim 11, comprising four prong members, four base ends, four prong ends, and four lip parts.

16. The apparatus of claim 11, wherein the base and at least one of the plurality of prong members form a unitary structure.

17. The apparatus of claim 11, wherein the front opening inner surface radius is greater than the rear opening inner surface radius.

18. The apparatus of claim 10, comprising a tube extension comprising:
    a tube extension inner surface radius substantially equal to the rear opening inner surface radius;
    a tube extension outer surface radius; and
    a tube extension rear opening;
    wherein the tube extension extends from the rear opening and is sized to be insertable in the passage; and
    wherein the base is operable to move the prong ends at least partially through the tube extension rear opening, thereby permitting a restoring force of the closed c-clip to open the closed c-clip.

19. The apparatus of claim 18, wherein each base end is evenly spaced to form at the base an outline of a regular polygon shape.

20. The apparatus of claim 18, wherein each prong end comprises a sector shaped prong end, and wherein the converged prong ends comprise at least one of a ring shape and a circle shape.

21. The apparatus of claim 20, wherein each sector shaped prong end is associated with a central angle approximately equal to the quotient of 360 degrees divided by a value representative of a total quantity of the plurality of prong ends.

22. The apparatus of claim 18, comprising four prong members, four base ends, four prong ends, and four lip parts.

23. The apparatus of claim 18, wherein the base and at least one of the plurality of prong members form a unitary structure.

24. The apparatus of claim 18, wherein a total length of the tube extension is sized to substantially equal to a total length of the passage.

25. The apparatus of claim 18, wherein the front opening inner surface radius is greater than the rear opening inner surface radius.

26. The apparatus of claim 25, wherein each base end is evenly spaced to form at the base an outline of a regular polygon shape.

27. The apparatus of claim 25, wherein each prong end comprises a sector shaped prong end, and wherein the converged prong ends comprise at least one of a ring shape and a circle shape.

28. The apparatus of claim 27, wherein each sector shaped prong end is associated with a central angle approximately equal to the quotient of 360 degrees divided by a value representative of a total quantity of the plurality of prong ends.

29. The apparatus of claim 25, comprising four prong members, four base ends, four prong ends, and four lip parts.

30. The apparatus of claim 25, wherein the base and at least one of the plurality of prong members form a unitary structure.

31. The apparatus of claim 25, wherein a total length of the tube extension is sized to substantially equal to a total length of the passage.

32. An apparatus for installing a c-clip outside a far end of a passage, the apparatus comprising:
 a plurality of prong members each comprising a base end and a sector shaped prong end, where at least one of the plurality of prong members comprise a resilient prong member, and where at least a subset of the plurality of prong member each have a lip part below the prong end;
 a base secured to the base ends so that each of the plurality of prong members are substantially parallel with each other of the plurality of prong members, so that the lip parts form a ring-shaped lip adapted to secure the c-clip, and so that each base end is evenly spaced to form at the base an outline of a regular polygon shape;
 a tube comprising an inner surface having a varying radius, an outer surface, a front opening having a front opening inner surface radius, and a rear opening having a rear opening inner surface radius, wherein the front opening inner surface radius is greater than the rear opening inner surface radius; and
 a tube extension having a tube extension inner surface radius substantially equal to the rear opening inner surface radius, a tube extension outer surface radius, and a tube extension rear opening, wherein the tube extension extends from the rear opening and is sized to be insertable in the passage;
 wherein the base is operable to insert the prong members at least partially through the front opening and against the inner surface, the inner surface forcing the c-clip to close into a closed c-clip and the prong ends to converge into converged prong ends; and
 wherein the base is operable to move the converged prong ends at least partially through the tube extension rear opening, thereby permitting a restoring force of the closed c-clip to open the closed c-clip.

33. The apparatus of claim 32, wherein a total length of the tube extension is sized to substantially equal to a total length of the passage.

34. The apparatus of claim 32, wherein the converged prong ends comprise at least one of a ring shape and a circle shape.

35. The apparatus of claim 32, wherein each sector shaped prong end is associated with a central angle approximately equal to the quotient of 360 degrees divided by a value representative of a total quantity of the plurality of prong ends.

36. The apparatus of claim 32, comprising four prong members, four base ends, four prong ends, and four lip parts.

37. A method for installing a c-clip outside a far end of a passage, the method comprising:
 providing a plurality of prong members each comprising a prong end and a base end, at least a subset of the plurality of prong member each have a lip part below the prong end;
 providing a base secured to the base ends, so that each of the plurality of prong members are substantially parallel with each other of the plurality of prong members, and so that the lip parts form a ring-shaped lip adapted to secure the c-clip;
 providing a tube comprising an inner surface having a varying radius, an outer surface, a front opening, and a rear opening;
 placing the c-clip on the ring-shaped lip;
 using the base to insert the prong members at least partially through the front opening and against the inner surface, so that the varying radius forces the c-clip to close into a closed c-clip and the prong ends to converge into converged prong ends; and
 using the base to move the prong ends at least partially through the rear opening.

38. The method of claim 37, wherein providing the plurality of prong members comprises providing at least one resilient prong member.

39. The method of claim 38, wherein using the base to move comprises using the base to move the prong ends at least partially through the rear opening to permit a restoring force of the closed c-clip to open the closed c-clip.

40. The method of claim 39, wherein providing a plurality of prong members comprises providing four prong members, four base ends, four prong ends, and four lip parts.

41. The method of claim 39, wherein providing the base and providing at least one of the plurality of prong members comprises providing a unitary structure.

42. The method of claim 39, wherein providing a tube comprises providing a tube having a front opening inner surface radius that is greater than a rear opening inner surface radius.

43. The method of claim 39, wherein providing the plurality of prong members comprises providing a plurality of a sector shaped prong ends.

44. The method of claim 39, wherein using the base to move comprises at least one of operating the base by hand, operating the tube by hand, operating the base by machine, and operating the tub by machine.

45. The method of claim 39, comprising:
 providing a tube extension extending from the rear opening, having a tube extension inner surface radius substantially equal to the rear opening inner surface radius, a tube extension outer surface radius sized to fit within the passage, and having a tube extension rear opening; and
 inserting the tube extension in the passage;
 wherein using the base to move comprises using the base to move the prong ends at least partially through the tube extension rear opening to permit a restoring force of the closed c-clip to open the closed c-clip outside the far end.

46. The method of claim 45, wherein providing a plurality of prong members comprises providing four prong members, four base ends, four prong ends, and four lip parts.

47. The method of claim 45, wherein providing the base and providing at least one of the plurality of prong members comprises providing a unitary structure.

48. The method of claim 45, wherein providing a tube comprises providing a tube having a front opening inner surface radius that is greater than a rear opening inner surface radius.

49. The method of claim 45, wherein providing the plurality of prong members comprises providing a plurality of a sector shaped prong ends.

50. The method of claim 45, wherein using the base to move comprises at least one of operating the base by hand, operating the tube by hand, operating the base by machine, and operating the tub by machine.

* * * * *